Figure 1:
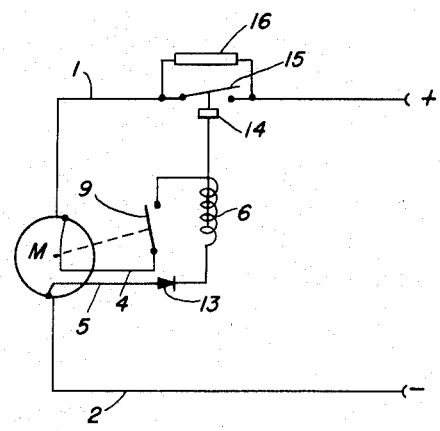

Nov. 30, 1965     H. SCHOLL     3,221,236
CENTRIFUGAL SWITCH FOR MOTOR SPEED CONTROL SYSTEM
Filed Feb. 21, 1963     2 Sheets-Sheet 1

INVENTOR
HERBERT SCHOLL
BY Kemon Palmer Stewart
& Estabrook
ATTORNEYS

Nov. 30, 1965    H. SCHOLL    3,221,236
CENTRIFUGAL SWITCH FOR MOTOR SPEED CONTROL SYSTEM
Filed Feb. 21, 1963    2 Sheets-Sheet 2

INVENTOR
HERBERT SCHOLL
BY
ATTORNEYS

United States Patent Office 3,221,236
Patented Nov. 30, 1965

3,221,236
CENTRIFUGAL SWITCH FOR MOTOR SPEED
CONTROL SYSTEM
Herbert Scholl, Nuremberg, Germany, assignor to Gebr.
Bühler Nachfolger G.m.b.H., Nuremberg, Germany
Filed Feb. 21, 1963, Ser. No. 260,214
Claims priority, application Germany, Feb. 24, 1962,
B 66,084
8 Claims. (Cl. 318—325)

The invention deals with the problem of keeping constant the speed of direct current motors such as are used primarily for driving sound track carrier apparatus and applies to an apparatus for regulating the speed of direct current motors with the aid of an auxiliary circuit taken from the armature of the motor.

Numerous types of regulated direct current motors are known which generally have a centrifugal governor rotating with the armature, the contact of which opens when the rated speed is reached and again closes when the speed drops. The current is picked up by means of a brush.

In the most simple construction the governor is connected in series with the motor and, if necessary, bridged by a resistance. Due to the extreme sensitivity of the contacts owing to the slight contacting pressure, this switching device has not proved satisfactory. Although the loading of the governor contact can be reduced to a fraction of the motor current by means of a switching transistor, the necessary constancy of speed can nevertheless not be attained because, particularly after long use, the direct current loading of the contacts leads to signs of material creeping and, under higher load, the contacts burn. Finally the reduction in voltage by means of brushes running on collecting rings is subject to numerous instability factors as regards the contact resistance, which frequently lead to fluctuations in the basic speed.

The object of the invention is to overcome these objections in the regulation of speed of direct current motors and to produce an apparatus which, while being very simple in construction, is characterized by a maximum degree of working reliability and also enables the object to be attained in an economically advantageous manner.

This object is achieved quite generally by incorporating in the auxiliary circuit a coil rotating about the axis of the armature and controlled by a centrifugal governor while in turn actuating the control element of the device which controls the current in the motor circuit. Owing to the elimination of all carbon contacts attained in this manner, not only constant running of the motor is achieved, but the servicing and consequently the running costs can be reduced considerably. On the other hand the contact load is kept at a minimum and it is at last possible to control an alternating current circuit with a governor contact.

The centrifugal governor connected in the auxiliary circuit consists of an extremely accurately operating speed feeler or gauge with very slight loading, having normally closed contacts which interrupts the flow of current through the rotating coil when the rated speed is reached.

In a further embodiment of the invention the auxiliary circuit is picked up or tapped off from two armature laminae (commutator bars) of the motor arranged oppositive each other. The voltage is naturally alternating current voltage which results in particular in functional advantages for the regulating device.

According to another feature of the invention the auxiliary circuit is fed by a generator arranged on the motor shaft. Which arrangement is to be given preference will depend primarily upon the condition in each individual case.

It has, moreover, been found particularly advantageous to construct the controlling element in the form of a polarized relay the energizing coil of which is the coil rotating with the armature. This form of construction is as simple as it is reliable. A rectifier is preferably arranged in the energizing circuit of the relay.

Another embodiment of the invention is characterized in that the control element has a stationary coil which is located in the field of the rotating coil and controls a switching contact of the motor circuit. In this manner the necessary controlling voltage can be taken from the secondary coil. A rectifier and/of an amplifier for the controlling current is preferably connected up to the output side of the stationary secondary coil.

Figure 3:
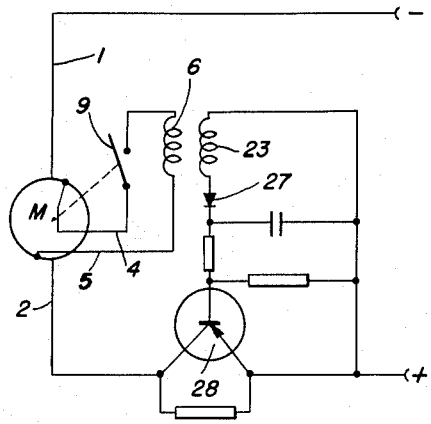
Figure 2:
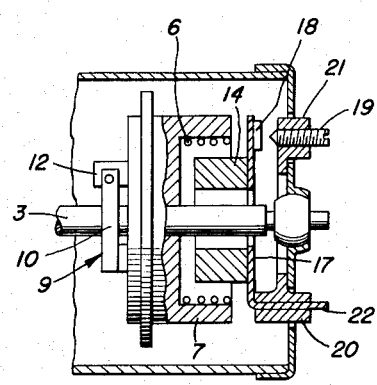
Figure 2A:
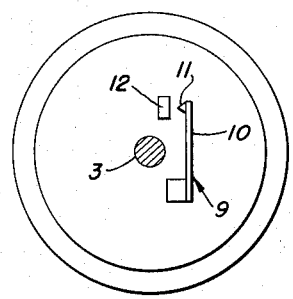
Figures 4, 4A:
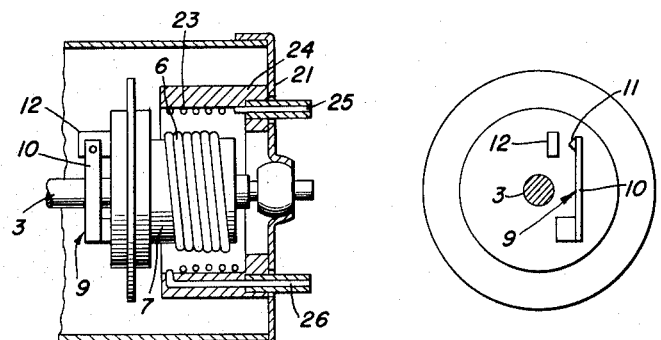
Figure 5:
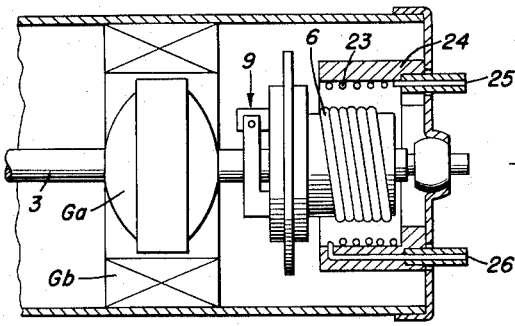
Figure 6:
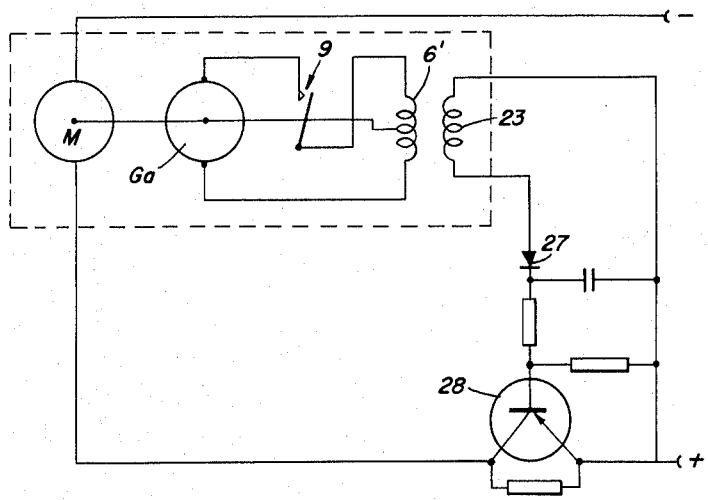

Further features, details and advantages of the invention will become apparent from the following description of the preferred embodiments illustrated by way of example in the accompanying drawings, in which:

FIGURE 1 is a circuit diagram;
FIGURE 2 is a diagrammatic view partly in section and partly in elevation showing the first embodiment of the invention;
FIGURE 2a is an end view of the embodiment shown in FIGURE 2;
FIGURE 3 shows another circuit diagram;
FIGURE 4 is a diagrammatic view partly in section and partly in elevation of a second embodiment of the invention;
FIGURE 4a is an end view of the embodiment shown in FIGURE 4;
FIGURE 5 is an embodiment incorporating a separate generator winding, and
FIGURE 6 is a circuit diagram of the embodiment of FIGURE 5.

Current is fed to the direct current motor designated by M by the wires 1 and 2. These wires are in turn connected to a source of current not shown in the drawings. The armature of the motor M, the shaft of which is designated by 3, is tapped at two opposite laminae (commutator bars or winding points) by the wires 4 and 5 which are connected to the coil 6 generally composed of only a few turns. The coil 6 is accommodated within the coil carrier 7 which is rigidly mounted on the armature shaft 3, so that this coil rotates with the armature. On the end face 8 of the coil carrier 7 nearer the motor armature there is a centrifugal governor 9 whose closing contact 11 carried on a resilient arm 10 can make or break the connection with the stationary contact 12. A rectifier 13 is connected in the wire 5 (FIG. 1) and arranged in front of the coil 6.

A permanent magnet 14 of annular form surrounds the shaft 3 and is mounted to move into the coil 6 and influences a regulator switch 15 which is bridged by a resistance 16 (FIG. 1). According to FIG. 2, the magnet 14 is mounted on a resilient arm 17 which has a hole therein through which the motor shaft 3 extends. If the magnet 14 moves into the coil 6 the connection between the closing contact 18 (of switch 15) and the contact pin 19 (of switch 15) will be broken and if it moves out of the coil the connection will be closed. The resilient arm 17 is in turn mounted in the insulating holder 20 on the bearing plate 21 and is connected to the wire 22.

In the form of construction illustrated in FIGS. 3 and 4 a secondary coil 23 is coupled with the coil 6 rotating with the armature of the direct current motor M, and in the example illustrated in FIG. 4 is located about the rotary coil which in turn is wound about the coil carrier 7' mounted on the armature shaft 3. The coil 23 is arranged inside a carrier element 24 fixed on the bearing plate 21 and connected to the wires 25 and 26. The current induced in the stationary coil is rectified by the rectifier 27 (FIG. 3) and passes over an amplifier to the switching transistor 28 which is arranged in circuit conductor 2 to feeding current to the motor M.

It is evident that the invention is not confined to the embodiments described and illustrated in the drawings but that numerous modifications are possible without departing from the scope of the invention. Thus, for example, instead of the voltage being tapped from the laminae or bars of the armature of the motor, a generator may be mounted on the motor shaft which derives its voltage from the armature. On the other hand it is also possible to arrange the secondary coil in some other place in relation to the rotating coil. It may for example be arranged inside or even beside the latter.

What I claim is:

1. Apparatus for regulating the speed of a direct current motor comprising, in combination, a centrifugal governor driven by the armature of the motor and having normally closed contacts, a coil rotating with the motor armature, an auxiliary circuit connecting said coil in series with said governor contacts, voltage generating means driven by said motor armature for supplying alternating current to said auxiliary circuit, a circuit for supplying operating current to said motor including a device for controlling said operating current, and means controlled by said rotating coil for controlling said device.

2. Apparatus according to claim 1, wherein the auxiliary circuit is tapped from two diametrically opposite points of the armature winding of the motor.

3. Apparatus according to claim 1, wherein the auxiliary circuit is fed by a generator arranged on the shaft of the armature.

4. Apparatus according to claim 1, wherein the control element consists of a polarized relay the energizing winding of which is the rotating coil.

5. Apparatus according to claim 4, wherein a rectifier is arranged in the energizing circuit of the relay.

6. Apparatus according to claim 1, wherein the control element has a stationary secondary coil which is arranged in the field of the rotating coil and controls a switching contact.

7. Apparatus according to claim 6, wherein the secondary coil is arranged concentric with the rotating coil.

8. Apparatus according to claim 7, wherein a rectifier and/or an amplifier is connected in series following the stationary secondary coil.

References Cited by the Examiner

UNITED STATES PATENTS

| | | | |
|---|---|---|---|
| 2,250,141 | 7/1941 | Thurston | 317—18 X |
| 2,981,089 | 4/1961 | Neyhouse et al. | 318—325 X |

ORIS L. RADER, *Primary Examiner.*